United States Patent [19]

Uzumaki et al.

[11] 4,125,486

[45] Nov. 14, 1978

[54] PARTIALLY POLYENIZED POLYVINYL ALCOHOL FIBERS WITH ION-EXCHANGE CAPACITY AND PROCESS FOR THE PRODUCTION THEREOF

[75] Inventors: Mitsutaka Uzumaki, Tokyo; Masahiko Takashio; Tadayoshi Utsumi, both of Fujieda, all of Japan

[73] Assignee: Nitivy Co., Ltd., Tokyo, Japan

[21] Appl. No.: 737,132

[22] Filed: Oct. 29, 1976

[30] Foreign Application Priority Data

Jul. 5, 1976 [JP] Japan .................................. 51-78873

[51] Int. Cl.² ...................... C08F 116/06; C08F 8/36; B01D 15/04
[52] U.S. Cl. ....................................... 521/32; 521/33; 526/27
[58] Field of Search .................. 526/9, 11; 260/2.1 R, 260/2.2 R; 428/375

[56] References Cited

U.S. PATENT DOCUMENTS

| | | | |
|---|---|---|---|
| 2,609,360 | 9/1952 | Daul et al. | 526/9 |
| 2,890,180 | 6/1959 | Cerny et al. | 526/9 |
| 3,068,061 | 12/1962 | Johnson et al. | 526/9 |
| 3,210,147 | 10/1965 | Johnson et al. | 526/9 |
| 3,226,380 | 12/1965 | Knight | 526/9 |
| 3,275,575 | 9/1966 | Fogle | 526/9 |
| 3,459,724 | 8/1969 | Hartel et al. | 526/9 |
| 3,859,269 | 1/1975 | Maurer | 526/9 |

FOREIGN PATENT DOCUMENTS

4,921,394 2/1974 Japan ...................................... 260/2.2

Primary Examiner—Joseph L. Schofer
Assistant Examiner—Peter Kulkosky
Attorney, Agent, or Firm—Sughrue, Rothwell, Mion, Zinn and Macpeak

[57] ABSTRACT

A partially polyenized polyvinyl alcohol fiber is obtained by heating and dehydration polyvinyl alcohol type fibers at temperatures of about 80° to 350° C so that the dehydration weight loss falls within the range of about 5% to 40%. An ion-exchange radical is introduced into the partially polyenized polyvinyl alcohol fiber to obtain fibers with an ion-exchange capacity. The ion-exchange fiber thus obtained exhibits an exchange capacity comparable to ion-exchange resins and has practical properties as fibers, such as good chemical resistance and flexibility.

10 Claims, 5 Drawing Figures

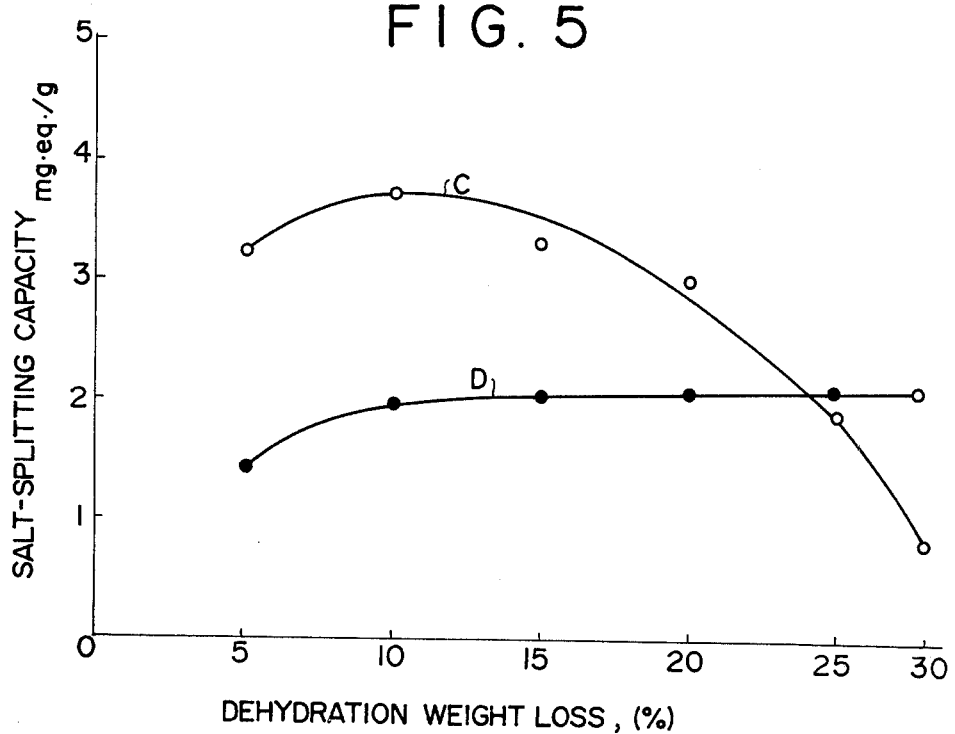

PARTIALLY POLYENIZED POLYVINYL ALCOHOL FIBERS WITH ION-EXCHANGE CAPACITY AND PROCESS FOR THE PRODUCTION THEREOF

BACKGROUND OF THE INVENTION

This invention relates to an ion-exchange fiber with practical fiber properties, obtained from a polyvinyl alcohol type fiber (hereinafter referred to as PVA type fiber) as the starting material.

Ion-exchange resins are usually produced by introducing an ion-exchange radical into a support of organic high molecular materials, for example, a styrene/divinylbenzene copolymer in the form of particles or planes by a chemical reaction.

If the ion-exchange radical is introduced into a fibrous support of organic high molecular materials, an ion-exchange fiber having the advantages of fibers can be obtained. However, when ion-exchange fibers having the same exchange capacity as one of the ion-exchange resin are dipped in water, they swell remarkably because of the ion-exchange radical being hydrophilic, so that the fiber cannot be used in practice due to the lowering of the physical properties. Therefore, the exchange capacity to be rendered to fibers is 2.5 mg eq./g at the most as a salt-splitting capacity.

Recently, carbon fibers have been developed to practical uses and as one of the applications, an ion-exchange fiber of heat and chemical resistances, in which carboxyl radical was introduced by oxidation or sulfonic radical was introduced by sulfonation has been provided. For example, Japanese Patent Publication No. 7523/72 discloses a process for the production of an ion-exchange fiber by introducing ion-exchange radicals into an electrically conductive carbon fiber. Also, a process for introducing ion-exchange radicals into carbon fibers starting from cellulose fibers or polyacrylonitrile fibers is disclosed in Japanese Patent Publication No. 37680/72.

However, ion-exchange fibers having a salt-splitting capacity of more than 2.5 mg eq./g cannot be obtained even if carbon fibers are reacted with sulfuric acid under drastic conditions to render them a strongly acidic cation exchange capacity. Thus, the exchange capacity of the ion-exchange fibers is remarkably inferior to that of the ion-exchange resins. The term "salt-splitting capacity" used herein is defined as follows: A column is filled with a strongly acidic cation exchanger in the form of H type and a solution of neutral salts such as sodium chloride is passed through. The salt-splitting capacity is indicated by equivalent numbers of acid formed to the weight of a sample.

SUMMARY OF THE INVENTION

An object of this invention is to provide ion-exchange fibers with good chemical and heat resistances and high tenacity, starting from PVA type fibers.

Another object of this invention is to provide ion-exchange fibers with good solvent resistance and flexibility and having an exchange capacity comparable to ion-exchange resins, starting from PVA type fibers.

In accordance with this invention, there are provided ion-exchange fibers comprising a partially polyenized PVA fiber (or a partial polyene PVA fiber) having ion-exchange radicals introduced therein, said partially polyenized PVA fiber being obtained by heating and dehydrating PVA type fibers at temperatures of about 80° to 350° C. so that the dehydration weight loss falls within the range of about 5% to 40%.

The ion-exchange fibers of this invention may be obtained by heating PVA type fibers containing a dehydration reaction accelerating agent at temperatures of about 80° to 350° C. so that the dehydration weight loss falls under the range of about 5% to 40% thereby forming a partially polyenized PVA fiber and introducing ion-exchange radicals such as sulfonic radical, amino radical or sulfuric ester radical into said partially polyenized PVA fiber.

In accordance with a particular modification of this invention, there are provided cation-exchange fibers comprising a partially polyenized PVA fiber having a sulfuric ester radical introduced by a sulfation reaction with hydroxyl groups of the remaining vinyl alcohol units, said partially polyenized PVA fiber being obtained by heating and dehydrating PVA type fibers at temperatures of about 80° to 220° C. so that the dehydration weight loss falls within the range of about 5% to 25%.

BRIEF DESCRIPTION OF THE DRAWINGS

FIG. 5 is a graph showing the relationship between the salt-splitting capacity of an ion-exchange fiber and the dehydration weight loss of the partially polyenized PVA fiber in the introduction of sulfuric ester radical into the partially polyenized PVA fiber according to this invention.

DETAILED DESCRIPTION OF THE INVENTION

Figure 1:
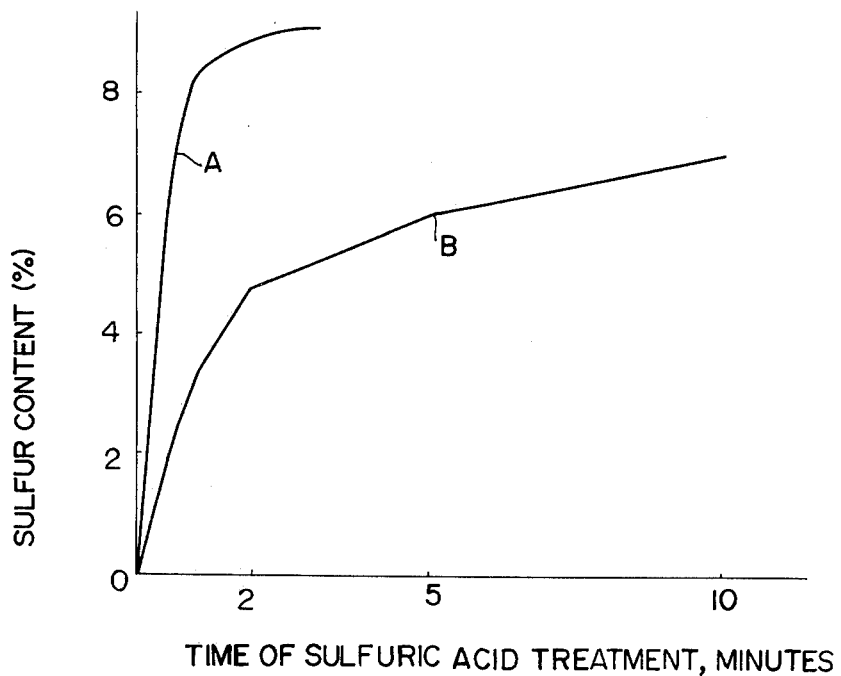
FIG. 1 is a graph showing the relationship between the time of a sulfuric acid treatment and the sulfur content in the introduction of sulfonic radical into the partially polyenized PVA fiber according to this invention.

PVA colors gradually by heating in air and as heated further, it changes from brown to black. It is said that this coloration is based on the formation of a polyene structure by heat-dehydration reaction of PVA.

We have found that a partially polyenized PVA fiber is suitable for use in ion-exchange fibers and that the partially polyenized PVA fiber is obtained by heating the PVA type fiber containing a dehydration reaction accelerating agent at temperatures of about 80° to 350° C. so that the dehydration weight loss falls within the range of about 5 to 40%.

The structure of the above partially polyenized PVA fiber should be characterized by a degree of polyenization or a conversion ratio of vinyl alcohol units to polyene structure units, but since the molecular structure of PVA used as the starting material is not uniform, for example, in the content of 1,2-glycol units and the degree of branching, it is difficult to define exactly the partially polyenized PVA by the degree of polyenization.

In this invention, therefore, the definition by the dehydration weight loss as indicated in the following is used:

Dehydration weight loss = A − B/A × 100 (%)

A: Sample weight before dehydration,
B: Sample weight after dehydration.

It is assumed that the dehydration weight loss of about 5 to 40% corresponds approximately to the degree of polyenization of 10 to 98 mol%.

The partially polyenized PVA fiber may, preferably, be obtained by spinning an aqueous solution of PVA containing a dehydration reaction accelerating agent to form PVA fibers, and heating and dehydrating the PVA fiber at temperatures of about 80° to 350° C., preferably, for 20–180 minutes so that the dehydration weight loss falls within the range of about 5 to 40%. For the spinning of the PVA solution, the conventional methods such as wet spinning, dry spinning and semi-melt spinning may be used. However, in case of the spinning solution containing a dehydration reaction accelerating agent, the use of the wet spinning method is not preferable because a part of said accelerating agent is left out in the coagulating bath and omitted during the washing of fibers.

For the purposes of conducting effectively the dehydration reaction while inhibiting the splitting of organic low molecular compounds during the dehydration, the dehydration reaction accelerating agent may be added in an amount of about 3%–15%, preferably 5% to 10% by weight of the PVA type fiber. With an amount of less than 3%, an effect as a catalyst is decreased. On the other hand, if exceeding 15%, the spinning becomes difficult and the catalytic effect is not so increased.

The accelerating agent which may be used in this invention includes, for example, strong acids such as phosphoric acid, polyphosphoric acid, sulfuric acid and hydrochloric acid, salts thereof, esters, amides, aryl sulfonic acids such as benzene sulfonic acid and toluene sulfonic acid, Lewis acids such as aluminum chloride. Preferably, the following may be used: Polyphosphoric acid ammonium represented by the formula,

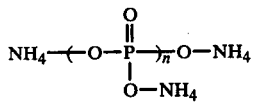

wherein $n$ is an integer of 10 to 400; polyphosphoric acid amides; phosphoric acid ammonium such as ammonium primary phosphate, ammonium secondary phosphate and ammonium tertiary phosphate or mixture thereof.

The partially polyenized PVA fiber suitable for the introduction of sulfonic radical or amino radical has, preferably, the dehydration weight loss of about 20 to 40%. Such partially polyenized PVA fibers may, preferably, be obtained by conducting the dehydration at temperatures of 250° to 350° C. in air, in an inert gas atmosphere or under vacuum for 20–180 minutes. The dehydration reaction may be, for example, conducted in air by elevating temperature at a rate of about 150° C./hr up to approximately 170° C., at a rate of about 200° C./hr up to 170°–200° C. and then increasing the elevating rate, and maintaining the temperature at 250°–350° C. for 20–180 minutes. The accelerating agent containing fibers cause a rapid dehydration reaction at 180°–190° C., but this undesirable phenomenon can be inhibited by lowering the elevating rate at about 200° C. as mentioned above.

If the weight loss is less than 20%, the fiber swells in the introduction of sulfonic radical and therefore, it causes a remarkable degradation. On the other hand, when exceeding 40%, a reaction rate of sulfonation is lowered and the amount of sulfonic radicals added is decreased so that fibers having a high salt-splitting capacity cannot be obtained.

If desired, it is preferred to conduct the dehydration reaction under tension to prevent the fiber from the shrinking during the dehydration.

It has been confirmed from the elementary analysis that the weight loss in the above heat treatment is due to only dehydration and no organic low molecular compounds are split out.

The partially polyenized PVA fibers thus obtained hardly swell in boiling water and are resistant toward acid and alkali solutions and other chemicals. They are also superior in durability to the starting PVA type fiber.

Figure 2:
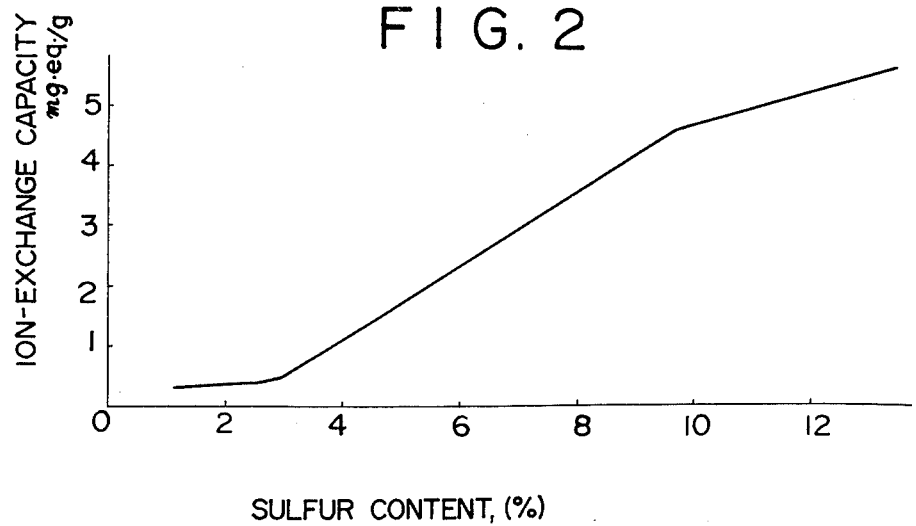
FIG. 2 is a graph showing the relationship between the sulfur content and the ion-exchange capacity in the introduction of sulfonic radical into the partially polyenized PVA fiber according to this invention.

Next, the introduction of sulfonic or amino radicals can be easily conducted into the partially polyenized PVA fiber at double bonds of the polyene structure. For the introduction of sulfonic radical, a sulfuric acid treatment may be carried out in the conventional methods. FIG. 1 shows the relationship between the time of sulfuric acid treatment at 100° C. and the sulfur content in respect of a partially polyenized PVA fiber having a dehydration weight loss 40%. Curve A shows the case treated by 98% $H_2SO_4$ and curve B shows the case treated by 90% $H_2SO_4$. It has been confirmed from these tests that an addition of sulfuric acid in a 3% sulfur content can be attained by treating with a 80% sulfuric acid at 80° C. for 30 minutes. As shown in FIG. 2, there is a close connection between the sulfur content and the cation-exchange capacity, and when the sulfur content exceeds 3%, a good cation-exchange capacity is obtained.

Figure 3:
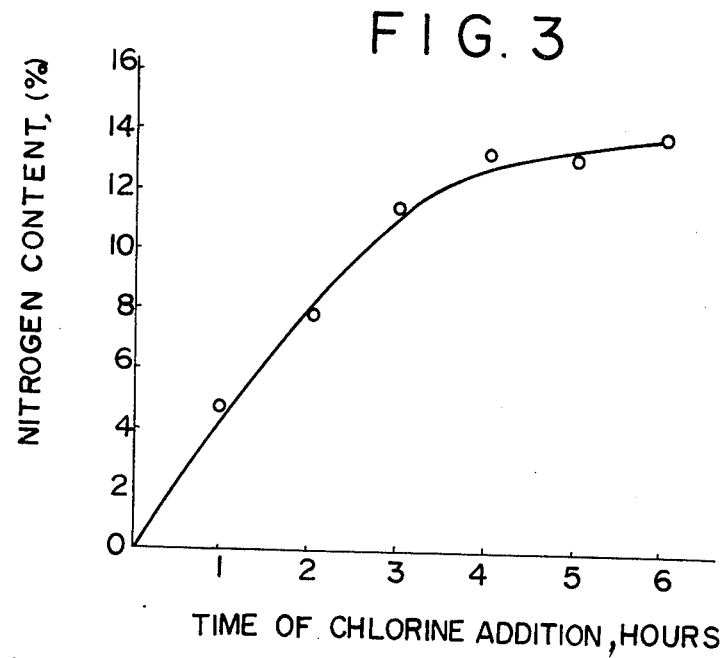
FIG. 3 is a graph showing the relationship between the time of chlorine addition and the nitrogen content in the introduction of amino radical into the partially polyenized PVA fiber according to this invention.
Figure 4:
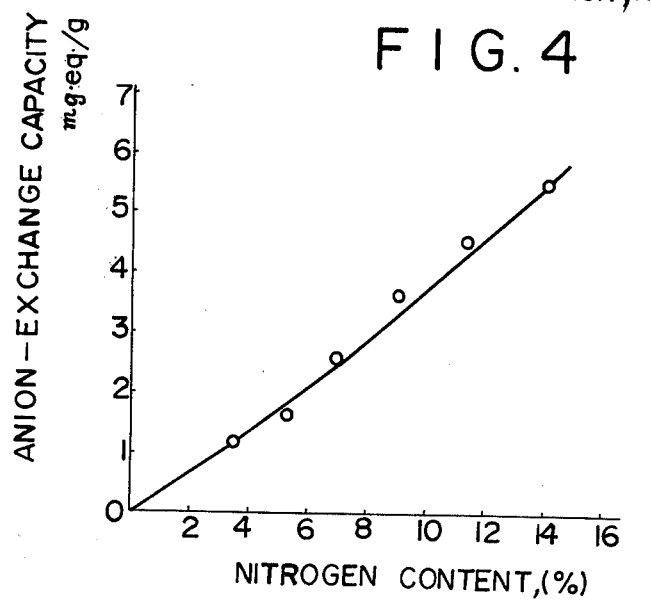
FIG. 4 is a graph showing the relationship between the nitrogen content and the anion-exchange capacity in the case of FIG. 3.

For the introduction of amino radical to render an anion-exchange capacity, a process of effecting a chlorine addition at the polyene structure units of the fiber and effecting amination with ammonia or trimethyl amine, or a process of effecting chloromethylation followed by amination are conveniently used. FIG. 3 shows the connection between the time of chlorine addition and the nitrogen content. The fiber sample for test was obtained by preparing a partially polyenized PVA fiber having a 40% weight loss and subjecting same to chlorine addition in an chlorine atomosphere at 110° C. for 1 to 6 hours, followed by amination with a 28% ammonia water at 110° C. for 3 hours. As shown in FIG. 4, there is a close connection between the nitrogen content and the anion-exchange capacity, and for rendering a practical ion-exchange capacity, the nitrogen content should be more than 7%.

According to the particular modification of this invention, a partially polyenized PVA fiber which may be conveniently used for a cation-exchange fiber having a sulfuric ester radical introduced therein may be obtained by heating and dehydrating PVA fibers containing a dehydration reaction accelerating agent at 80°–220° C. so that the dehydration weight loss falls within the range of about 5 to 25%. Next, for introducing a sulfuric ester radical as a cation-exchange radical, the above partially polyenized PVA fiber is subject to a sulfation reaction with hydroxyl groups of the remaining vinyl alcohol units in a sulfuric acid bath containing salts.

It is assumed that the weight loss of about 5 to 25% corresponds approximately to the degree of polyenization of 10 to 65 mol%. If the weight loss is less than about 5%, the partially polyenized PVA fiber is swelled to a remarkable degradation in the introduction of sulfuric ester radical, and thus the properties as fibers are lowered. On the other hand, with the weight loss of more than about 25%, the sulfation reaction falls off because of the remaining hydroxyl radicals lowers in amount, so that the exchange capacity is reduced.

A preferred embodiment for the preparation of the above partially polyenized PVA fiber comprises spinning an aqueous solution of PVA containing the dehydration accelerating agent to obtain a PVA type fiber and heating the PVA fiber at about 80° to 220° C. for 10-180 minutes so that the dehydration weight loss falls within the range of about 5 to 25%, preferably about 10 to 20%.

The dehydration reaction may be effected by elevating temperature at any rate up to 60° C., then at a rate of 20°-150° C./hr and maintaining the temperature at 80°-220° C. for 10-180 minutes. By way of example for a preferred dehydration treatment, the partially polyenized PVA fiber having a weight loss of 10 to 20% is obtained by elevating temperature at 50°-110° C./hr and maintaining the temperature at 180°-190° C. for 30-80 minutes.

Next, sulfuric ester radical as a cation-exchange radical is introduced into the partially polyenized PVA fiber at hydroxyl groups of the remaining vinyl alcohol units. A bath for the sulfation reaction comprises, preferably, sulfuric acid of a concentration of 80-100% or fuming sulfuric acid containing $SO_3$ up to 60% and salts, preferably, sulfates or bisulfates in an amount of from 10% by weight of the bath to its saturation concentration. Examples of the salt forming cation include ammonium, potassium and sodium. With a sulfuric acid concentration of less than 80%, sulfuric ester radicals introduced are few in amount and therefore, the ion-exchange capacity is lowered. If the salt content is less than 10% based on the weight of the bath, the sulfation reaction hardly takes place and the sulfonation reaction at the double bonds of the polyene structure mainly takes place, so that the salt-splitting capacity is lowered.

The sulfation reaction may be effected at 10°-100° C., preferably 10°-40° C. The reaction time is usually more than 2 minutes and may be appropriately determined depending on the temperature.

By adding the above salts to the sulfation bath, the degradation of the remaining vinyl alcohol units which may be caused by sulfuric acid is inhibited and the sulfation reaction is advanced. At this time, the sulfonation reaction at the polyene structure units hardly take place. With the bath free of salts, the degradation of the remaining vinyl alcohol units takes place simultaneously with the sulfonation of the polyene units. The foregoing are demonstrated by the following experimental facts: When the cation-exchange fiber of this invention is made H type, dipped in water and retained at 100° C. for 24 hours, the exchange capacity is lowered to approximately zero. It is clear from this test that in this invention the ion-exchange radical is rendered by sulfuric ester. On the other hand, in case of the sulfonated polyene fiber which was treated in a sulfuric acid bath free of salts, such the lowering of exchange capacity is not observed.

FIG. 5 shows the connection between the salt-splitting capacity and the dehydration weight loss in respect of the ion-exchange fiber. Curve C shows the rendering of ion-exchange capacity by the sulfation reaction using a 98% $H_2SO_4$ bath containing 30% by weight of $K_2SO_4$. Curve D shows the rendering of ion-exchange capacity by the sulfonation reaction using a 98% $H_2SO_4$ bath. Both the sulfation and the sulfonation are carried out at normal temperature, at the bath ratio of 1:100 for 24 hours.

The partially polyenized PVA fibers defined by the dehydration weight loss as showned in FIG. 5 are prepared by maintaining PVA fibers containing 5% of polyphosphoric acid ammonium in air at 180° C. during the heating time as indicated in Table 1 to effect the dehydration reaction.

Table 1

| Heating Time, minutes | 20 | 40 | 60 | 120 | 180 | 300 |
|---|---|---|---|---|---|---|
| Weight loss, % | 5.1 | 9.8 | 15.7 | 20.8 | 24.8 | 30 |

It is clear from FIG. 5 that when salts are present in the sulfuric acid bath, the salt-splitting capacity of fibers obtained is remarkably increased and that when the weight loss exceeds about 25%, the salt-splitting capacity is reduced. As mentioned hereinbefore, with the weight loss of less than about 5%, the properties as fibers are lowered.

In this way, the addition of salts to the sulfuric acid bath makes the sulfation reaction possible even at such the lower weight loss range as about 5-25%. Therefore this invention has the great advantages that ion-exchange fibers are obtained with a high yield and the salt-splitting capacity is remarkably increased. Further, by the addition of salts there are provided the industrial advantages that the coloration of a reaction bath and the formation of a poisonous gas are inhibited and heat of reaction is controlled.

In the cation-exchange fiber with sulfuric ester radical is within the range of 2.0 to 4.0 mg eq./g and the total cation exchange capacity including the weakly acidic exchange capacity based on carboxyl radical is 2.5-5.5 mg eq./g. Also, even when the cation-exchange fiber is dipped in a 2N HCl solution which is normally used for regeneration for four days, a lowering of the capacity is not observed. Further, these ion-exchange fibers have good flexibility and solvent resistance, and are superior in durability.

After the introduction of ion-exchange radical according to this invention, the fiber may be formed to any products, such as threads, yarns, fabrics or nonwoven fabrics. Alternatively, the dehydration step and the ion-exchange radical introducing step may be applied after the formation of the starting PVA type fiber to any products.

This invention will be illustrated by the following examples.

EXAMPLE 1

A commercially available PVA with the average degree of polymerization of 1,200 and the degree of saponification of 99.9% was heated and dissolved in water to obtain an aqueous 30% solution, and 5% by weight of polyphosphoric acid ammonium based on the PVA were added. The PVA solution obtained was extruded in hot air at 150° C. through a spinneret and filaments were formed according to dry spinning.

When the filaments obtained were stretched seven times in hot air at 200° C., a white fiber having a strength of 5 g/d and an elongation of 10% was obtained. The white fiber was heated under tension in air at 320° C. for 3 hours and thus, a partially polyenized PVA fiber with a weight loss of 30% was obtained. Strength 2,200 kg/cm$^2$; Elongation 10%. The partially polyenized PVA fiber is not attached with a 60% sulfuric acid at 60° C., and has good chemical and heat resistances.

Next, when the above fiber was treated in a 90% sulfuric acid bath at 100° C. for 30 minutes, a fiber with a cation-exchange capacity having a sulfur content of 4% was obtained. This treatment had little influence on the elongation and tenacity of fiber. Ion-exchange capacity; 1.2 mg eq./g.

EXAMPLE 2

A commercially available PVA with the average degree of polymerization of 1,200 and the degree of saponification of 99.9% was heated and dissolved in water to obtain an aqueous 30% solution, and 5% by weight of polyphosphoric acid ammonium based on the PVA were added. The PVA solution obtained was extruded in hot air at 150° C. through a spinneret and filaments were formed according to dry spinning.

When the filaments obtained were stretched seven times in hot air at 200° C., a white fiber having a strength of 5 g/d and an elongation of 10% was obtained. The white fiber was heated under a tension of 2 mg/d at an elevating rate of 50° C./hr to 300° C. and maintained at this temperature for 3 hours and thus, a partially polyenized PVA fiber with a weight loss of 36% was obtained. Strength 2,000 kg/cm$^2$; Elongation 10%. The partially polyenized PVA fiber is not attached with a 60% H$_2$SO$_4$ and a 40% NaOH at 60° C., and has good chemical and heat resistances.

Next, when the above fiber was treated in a chlorine atmosphere at 60° C. for 6 hours and then treated with a 28% ammonia water at 110° C. for 3 hours, a fiber with an anion-exchange capacity having a nitrogen content of 13% was obtained. This treatment had little influence on the elongation and tenacity of fiber. Ion-exchange capacity; 4.5 mg eq./g.

EXAMPLE 3

When the partially polyenized PVA fiber obtained in Example 1 was treated with chloromethyl ether in the presence of aluminum chloride as a catalyst at 60° C. for 24 hours and then trimethylamine gas was passed through thereto at 50° C. for 3 hours, a strongly basic anion-exchange fiber with an ion-exchange capacity of 1.8 mg eq./g was obtained. Strength 1,600 kg/cm$^2$; Elongation 7.5%.

EXAMPLE 4

A commercially available PVA with the average degree of polymerization of 1,200 and the degree of saponification of 99.9 mol% was heated and dissolved in water to obtain an aqueous 30% solution, and 5% by weight of polyphosphoric acid ammonium based on the PVA were added. The PVA solution obtained was subject to dry spinning in the conventional manner. The fiber obtained has a strength of 5 g/d and an elongation of 10%.

This fiber was heated from 60° C. to 180° C. at an elevating rate of 100° C./hr in air and maintained at this temperature for 30 minutes and 40 minutes to obtain two classes of partially polyenized PVA fibers having a weight loss of 7% and 10% respectively. The fibers obtained have a strength of 3.5 g/d and 3.0 g/d, respectively and both are a flexible fiber with an elongation of about 9.0%. Also, they cause no swelling and shrinking by a boiling water treatment and withstand a 6.0 N sodium hydroxide and surfuric acid, and can be knitted by the conventional knitting machine.

Next, the fiber samples knitted after the above dehydration treatment were dipped in a reaction bath consisting of 3 parts by weight of ammonium sulfate and 7 parts by weight of a 98% H$_2$SO$_4$ at normal temperature for 24 hours to effect a sulfation reaction. Thus the two knitted ion-exchange fibers having a salt-splitting capacity of 4.0 mg eq./g and 3.7 mg eq./g, respectively were obtained.

EXAMPLE 5

The dehydration treatment and sulfation reaction were effected in the same procedure as in Example 4 except that ammonium secondary phosphate was used as the dehydration reaction accelerating agent. The fiber obtained has the same salt-splitting capacity as one of Example 4.

EXAMPLE 6

An aqueous 30% solution of a commercially available PVA with the average degree of polymerization of 1,200 and the degree of saponification of 99.9 mol% was added with 5 weight % of polyphosphoric acid ammonium based on the PVA, and spinned according to the conventional dry spinning method. The PVA fiber obtained has a strength of 5 g/d and an elongation of 10%.

Then, the fiber was heated under a tension of 5 mg/d from 60° C. to 180° C. at an elevating rate of 100° C./hour and maintained at 180° C. for one hour. The dehydration fiber obtained has a weight loss of 14%, a strength of 2.5 g/d and an elongation of 12%.

Next, the dehydrated fiber was subject to a sulfation reaction in a bath consisting of 3 parts by weight of ammonium sulfate and 7 parts by weight of a fuming sulfuric acid containing SO$_3$ of 20% at normal temperature for 24 hours. The ion-exchange fiber obtained has a salt-splitting capacity of 3.9 mg eq./g.

This ion-exchange fiber was made Na type and dried at 80° C. for 24 hours or retained in a 2.0 N NaOH solution at 60° C. for 24 hours, but it shew no lowering of the capacity and exhibited a good durability. Also, this fiber, when dipped in a 12 N HCl solution at normal temperature for 15 minutes, shew no lowering of the capacity and thus, it has a good acid resistance under a normal regeneration condition.

EXAMPLE 7

With use of the polyphosphoric acid ammonium containing PVA fiber used in Example 4, a non-woven fabric with a weight of 150 g/m$^2$ was prepared according to a needle punching method.

This non-woven fabric was heated from 60° C. to 180° C. at an elevating rate of 100° C./hr in air and maintained at this temperature for 90 minutes to obtain a partially polyenized PVA non-woven fabric with a weight loss of 20%. Next, the non-woven fabric obtained was subject to a sulfation reaction in a bath consisting of 3 parts by weight of ammonium sulfate and 7 parts by weight of a 98% H$_2$SO$_4$ at normal temperature for 24 hours. Thus, an ion-exchange non-woven fabric with a salt-splitting capacity of 3.5 mg eq./g was obtained.

What we claim is:

1. Fibers with an cation-exchange capacity comprising a partially polyenized polyvinyl alcohol fiber having a sulfuric ester radical introduced therein by a sulfation reaction with hydroxyl groups of the remaining vinyl alcohol units, said partially polyenized polyvinyl alcohol fiber being obtained by heating and dehydrating a polyvinyl alcohol type fiber so that the dehydration weight loss falls within the range of about 5 to 25%.

2. A process for the preparation of cation-exchange fibers which comprises heating a polyvinyl alcohol type fiber containing a dehydration reaction accelerating agent at temperatures of 80° C. to 220° C. so that the dehydration weight loss falls within the range of about 5 to 25% thereby obtaining a partially polyenized polyvinyl alcohol fiber, and subjecting said partially polyenized polyvinyl alcohol fiber to a sulfation reaction with hydroxyl groups of the remaining vinyl alcohol units in a salt containing sulfuric acid bath thereby introducing a sulfuric ester radical as a cation-exchange radical.

3. The process of claim 2 wherein the sulfation reaction is effected in a bath comprising sulfuric acid of a concentration of 80 to 100% or a fuming sulfuric acid containing $SO_3$ up to 60% and salts in amounts of from 10% by weight of the bath to its saturation concentration at temperatures of 10° C. to 100° C.

4. The process of claim 2 wherein said salt for sulfuric acid bath is a sulfate or a bisulfate.

5. The fiber of claim 1, wherein said dehydration weight loss falls within the range of about 10 to 20%.

6. The process of claim 2, wherein the dehydration weight loss falls within the range of 10 to 20%.

7. The process of claim 4, wherein said sulfate or bisulfate is a salt of ammonium, sodium or potassium.

8. The process of claim 2 wherein said heating comprises heating said fiber from 60° C. to a temperature of 180° to 190° C. at a rate of 50° to 110° C. per hour and maintaining the temperature at 180° to 190° C. for 30 to 80 minutes.

9. The process of claim 2 wherein said dehydration reaction accelerating agents is selected from the group consisting of phosphoric acid, polyphosphoric acid, sulfuric acid, hydrochloric acid, salts thereof, esters thereof, amides thereof, benzene sulfonic acid, toluene sulfonic acid and aluminum chloride.

10. The process of claim 2, wherein said dehydration reaction accelerating agent is polyphosphoric acid ammonia represented by the formula

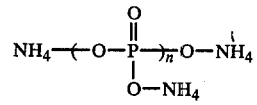

wherein $n$ is an integer of 10 to 400; polyphosphoric acid amides; ammonium primary phosphate, ammonium secondary phosphate and ammonium tertiary phosphate.